Figure 4:
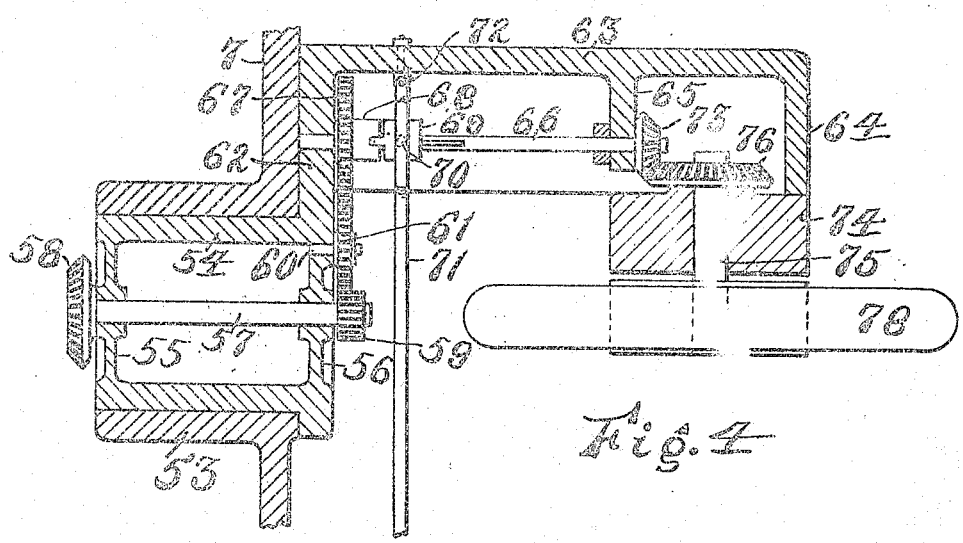

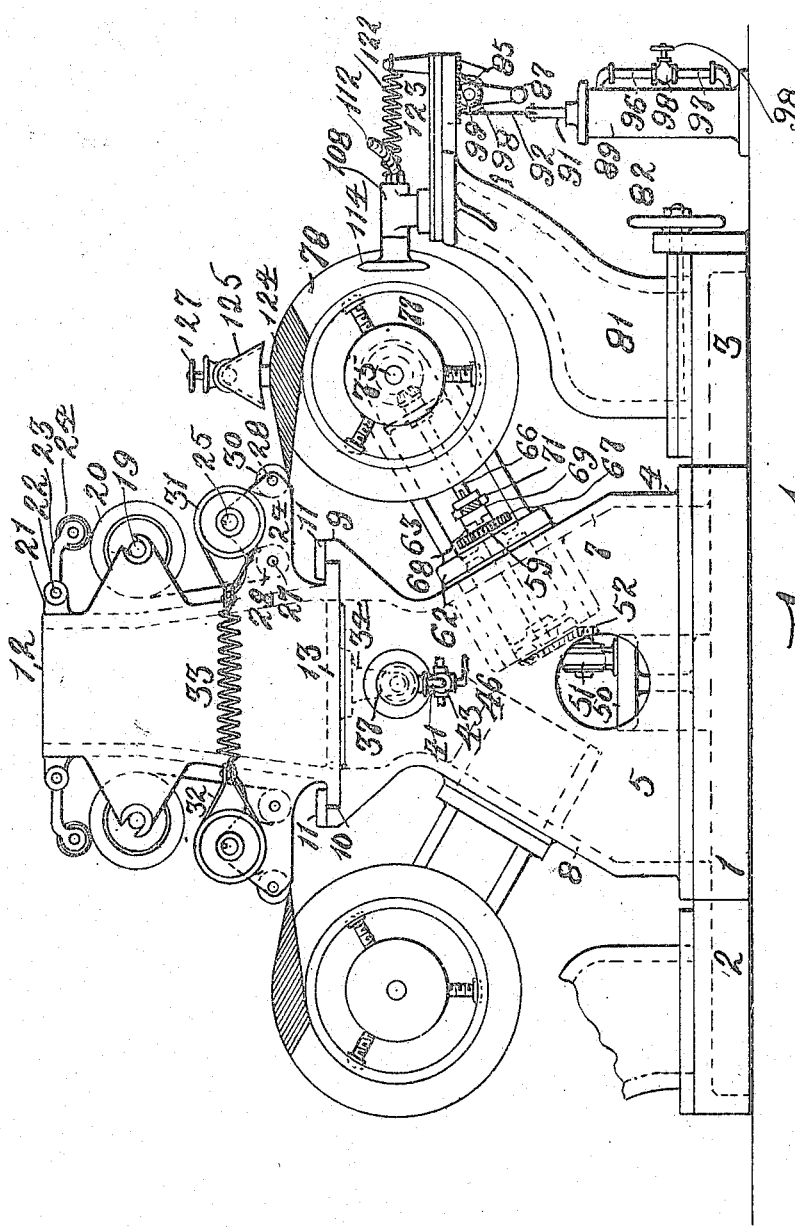

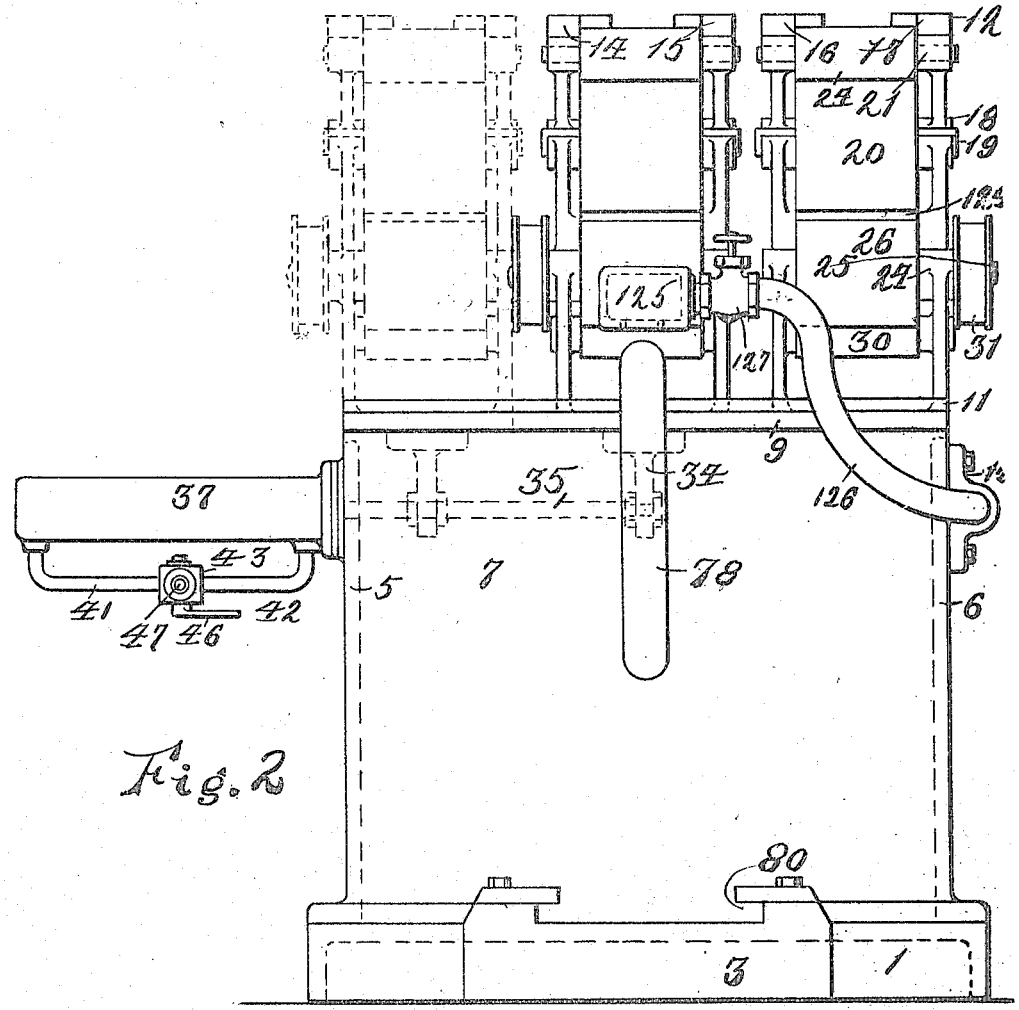
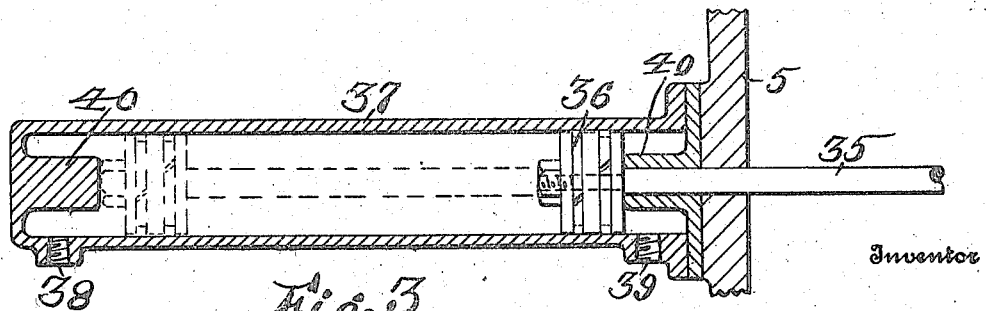

M. PARIDON.
MACHINE FOR MAKING PNEUMATIC TIRE SHOES.
APPLICATION FILED JUNE 12, 1916.

1,202,884.

Patented Oct. 31, 1916.
5 SHEETS—SHEET 3.

Witness
S. W. Brainard.

Inventor
Michael Paridon.
By C. E. Humphrey
Attorney

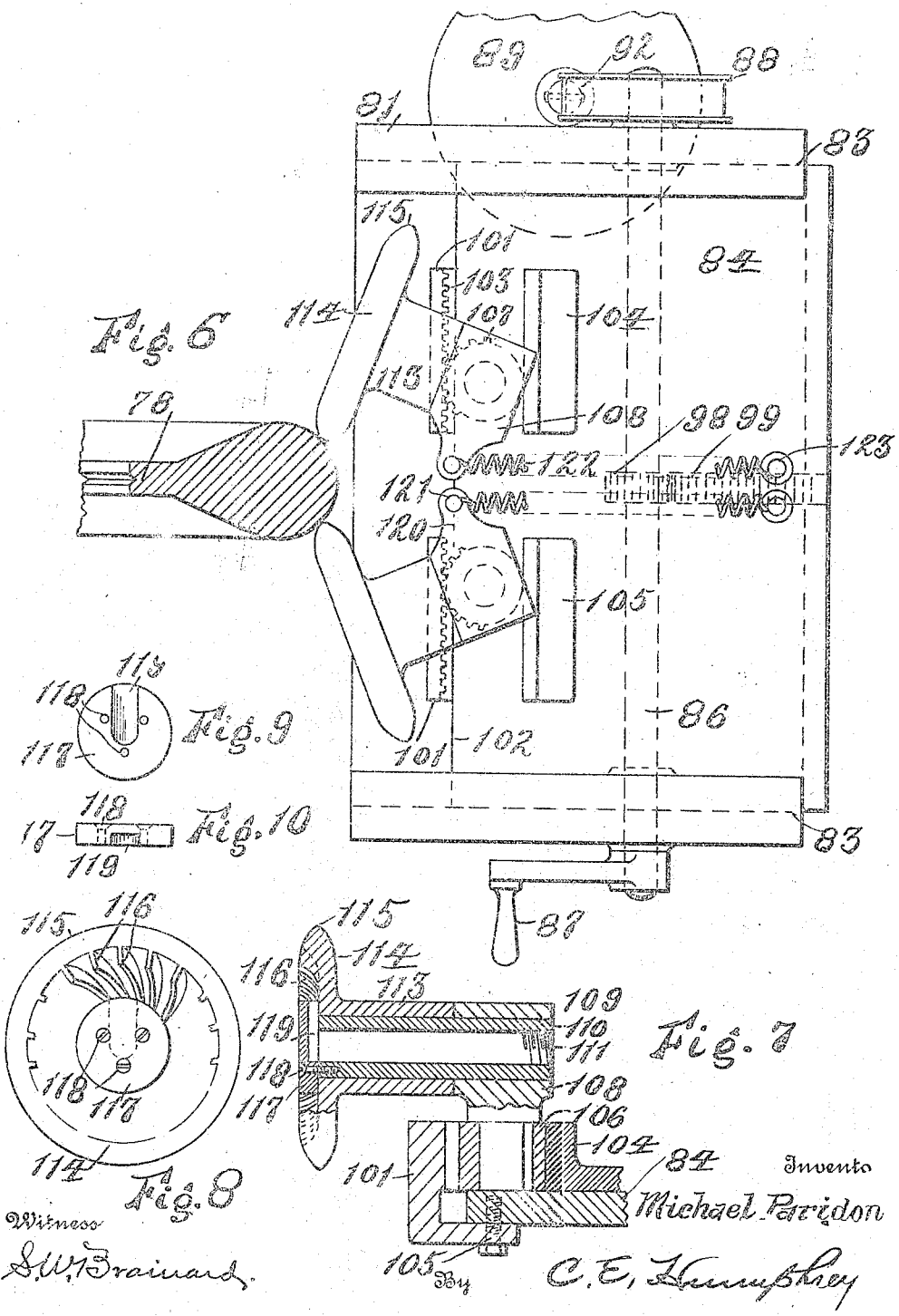

M. PARIDON.
MACHINE FOR MAKING PNEUMATIC TIRE SHOES.
APPLICATION FILED JUNE 12, 1916.
1,202,884.
Patented Oct. 31, 1916.
5 SHEETS—SHEET 5.
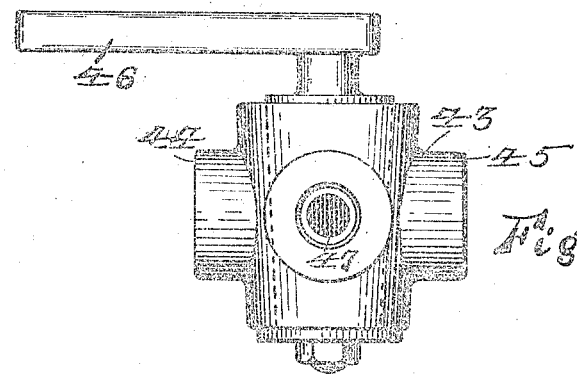
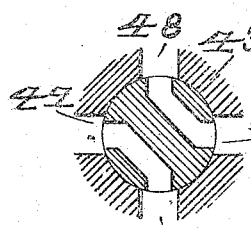 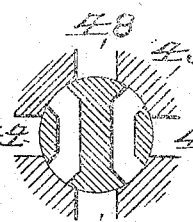 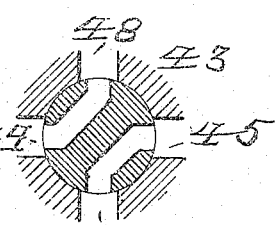
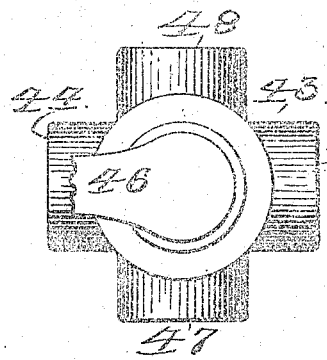
Inventor
Michael Paridon.
Witness
G. W. Brainard
By C. E. Humphrey
Attorney

UNITED STATES PATENT OFFICE.

MICHAEL PARIDON, OF BARBERTON, OHIO, ASSIGNOR OF ONE-HALF TO HENRY A. RUDD, OF BARBERTON, OHIO.

MACHINE FOR MAKING PNEUMATIC-TIRE SHOES.

1,202,884.  Specification of Letters Patent. Patented Oct. 31, 1916.

Application filed June 12, 1916. Serial No. 103,224.

*To all whom it may concern:*

Be it known that I, MICHAEL PARIDON, a citizen of the United States, residing at Barberton, in the county of Summit and State of Ohio, have invented new and useful Improvements in Machines for Making Pneumatic-Tire Shoes, of which the following is a specification.

This invention relates to improvements in machines for manufacturing tire casings or pneumatic-tire-shoes from flat sheets of rubber coated fabric to be used in connection with an inflated inner rubber tube to constitute a double tube pneumatic-tire such as are now used on automobiles and the like.

The object of the invention is to provide an improved machine comprising a power driven ring-core in connection with a suitable number of stock rolls which have wound thereon strips of fabric skim-coated or impregnated with rubber and cut on the bias.

A further object is to provide improved means for the placing of the various plies or layers of tire-shoe-building material on the core during the construction thereof and generally to improve the construction and thereby increase the efficiency of machines designed for this general purpose.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures—

Figure 5:
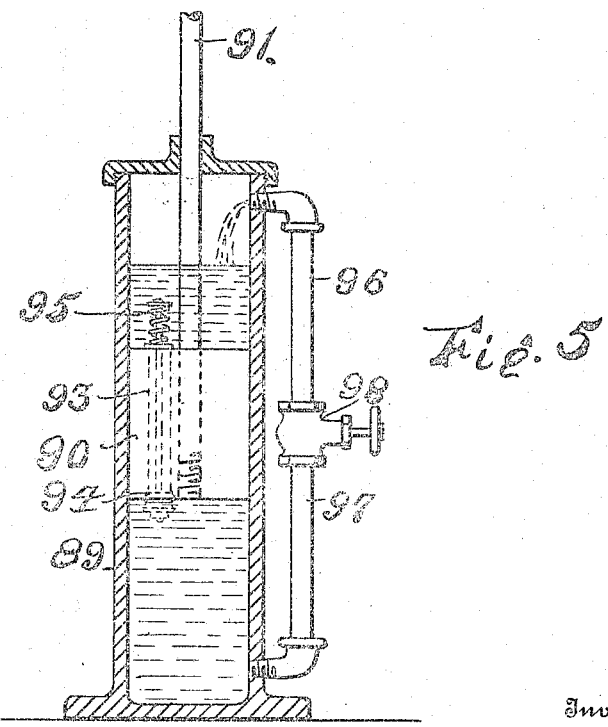

Figure 1, is a view in end elevation of a machine embodying this present invention. Fig. 2, is a view in side elevation looking from the right of Fig. 1 with portions of the mechanism shown therein removed. Fig. 3, is a longitudinal sectional view of a fluid motor for shifting the position of the stock rolls. Fig. 4, is a sectional view of the supporting and operating means for the ring-core. Fig. 5, is a vertical central sectional view of a motor for operating the mechanism by which the various plies of tire-building material are applied to the core. Fig. 6, is a plan view of the mechanism for smoothing and applying the fabric to the core. Fig. 7, is a longitudinal sectional view of one of the smoothing rolls and its supporting mechanism. Fig. 8, is a view of the smoothing tool shown in Fig. 7 looking from the left of the latter figure. Fig. 9, is a plan of a discharge nozzle employed on the tool shown in Fig. 7. Fig. 10 is a view in side elevation of the device shown in Fig. 9. Figs. 11 to 15 inclusive are details of a four-way valve employed in connection with the device shown in Fig. 3.

Referring specifically to the drawings reference numeral 1 denotes a base on which the mechanism is mounted and this base is preferably cruciform in shape and provided with lateral extensions 2 and 3.

Mounted on the base 1 is a hollow housing 4 provided with end walls 5 and 6 and further provided with side walls 7 and 8. These side walls 7 and 8 are inwardly inclined toward each other and at the upper ends are outwardly flared to form a table in which is a longitudinally-extending groove 10. Secured to the lateral portions of the table 9 are inwardly-extending strips 11 to thereby convert the groove 10 into a channel or way for the longitudinal shifting of a carriage to be later described.

Slidably mounted in the channel 10 is a carriage denominated generally by the reference numeral 12 comprising a base plate 13 of proper size to be received in the channel 10. Extending upwardly from the base plate 13 are a plurality of frames 14, 15, 16, and 17 arranged in pairs with the frames 14 and 15 constituting one pair and with frames 16 and 17 constituting the other pair. These frames and their accompanying mechanism are identically similar and hence a description connected with one pair, say for instance the frames 14 and 15 is believed to be sufficient for the understanding of both. Furthermore the mechanism on opposite sides of the frame is similar and hence a description of the mechanism of one side and of one pair of frames is believed to be sufficient, and it may be here stated for brevity that the machine shown in Fig. 1 is a duplex device and the mechanism on opposite sides of a vertical line drawn centrally through the base 1 are similar and hence the description will be confined to mechanism on the right of an imaginary central vertical line in Fig. 1. The frames 14 and 15 are provided with laterally projecting brackets 18 in the outer portions of which are open bearings to receive the projecting ends of a shaft 19 bearing a stock-roll 20 on which is wound a supply of rubber coated or impregnated fabric alternating with a lining strip for preventing adhesion of successive layers of strips to each other. Projecting laterally from the frames 14 and 15 are a pair of oppositely disposed bearings 21 in which is a shaft 22 bearing a frame 23 carrying a take-up roller 24 onto which the lining strip originally wound on the stock-roll 20 is wound as the strip of tire-building material is unwound from the stock-roll 20. Near the lower portion of the frames 14 and 15 and extending laterally therefrom are two brackets 24 oppositely disposed to each other and each provided with a bearing for a shaft 25 on which is a tension roll 26, see Fig. 2. On opposite sides of, and below the shaft 25, the brackets 24 are provided with apertures constituting bearings for shafts 27 and 28 on which are guiding rollers 29 and 30 respectively. Both shafts 25 on opposite sides of the frames 14 and 15 bear flanged pulleys 31 to receive brake-bands 32 preferably connected with each other through the medium of a coil-spring 33. The brake-bands 32 on the peripheral faces of the flanged pulleys 31 create sufficient friction on the pulleys 31 to retard the rotation of the roll 26 and this frictional braking or resistance to rotation is constantly insured by means of the coil-spring 33.

In operation a stock roll 20 provided with alternate winding of shoe-building material and a lining strip is placed in the bearings in the brackets 18 and the shoe-building strip is carried downwardly around the guiding roller 29 and thence upwardly over the tension roll 26 and thence downwardly around the guiding roll 20 to the forming core, to be described. It is contemplated that the strength-giving threads of the stock roller supported by frames 14 and 15 will be positioned at right angles to the strength-giving threads of the stock rollers supported by frames 16 and 17 and in order to shift these two frames longitudinally of the device to bring them alternately into alinement with the forming core to which the shoe-building-stock is carried, I employ the following mechanism: Depending from the under-face of the base plate 13 is a bracket 34 provided with an aperture to receive a piston rod 35 equipped at its outer end with a piston head 36 and adapted to reciprocate in a cylinder or motor 37 secured to the end wall 5 of the housing 4. The cylinder is provided at one end with a port 38 and at its opposite end with a port 39.

The piston rod 35 extends through a suitable opening in the wall 5 and the cylinder 37 is provided at opposite ends with stops 40 for limiting the movement of the piston head and the carriage bearing the frames carrying the stock rollers. Extending from the port 38 is a pipe 41 and a pipe 42 leads from the port 39. The inner ends of the pipes 41 and 42 are connected with a four-way valve denominated generally by the reference numeral 43 as shown in Figs. 11 to 15, inclusive. The valve 43 comprises the usual casing having a socket 44 to receive the pipe 41 and a socket 45 to receive the pipe 42. The valve proper is controlled by an operating handle 46. The casing is also provided with an inlet opening 47 connected with a supply of a fluid under pressure such as air or water and is also provided with an exhaust opening 48. When the valve, operated by the handle 46 is in the position shown in Fig. 2 the supply inlet is connected with the pipe 41 and the port 38 for moving the piston to the right in Figs. 2 and 3. When the valve is in the position shown in Fig. 14 the fluid under pressure is admitted from the supply pipe to the pipe 42 and the fluid is admitted to the port 39 for shifting the piston 39 to the left in Figs. 2 and 3. When the valve is in the position shown in Fig. 12 the exhaust fluid from the pipe 42 passes outwardly through the valve and the exhaust 48 and the same operation takes place with respect to the exhaust fluid in the pipe 41 when the valve is in the position shown in Fig. 13 both the inlet, exhaust and the pipes 41 and 42 are closed and the valve is then said to be in its neutral position.

Mounted within the chamber inclosed by the housing 4 is a supporting platform, see Fig. 1, on which is mounted an electric motor 51 the armature shaft of which is provided with a bevel-gear 52. The wall 7 is provided with an inwardly-extending sleeve-like projection 53 constituting a seat and support for the mechanism for supporting and rotating the ring-core and which consists of a frame embodying an inwardly-extending tubular member 54 arranged to seat in the opening in the projection 53 and is held against movement thereby. This tube-like member is provided at one end with a head 55 bearing a centrally-positioned bearing and at its opposite end with a head 56 the latter provided with a bearing in alinement with the bearing in the head 55 and in these two bearings is mounted a rotatable shaft 57. The shaft 57 bears at one end a bevel-gear 58 arranged to intermesh with the gear 52 on the armature shaft of the motor 51. The shaft 57 bears at its opposite end a spur-gear 59. Also mounted in the head 56 is a stub shaft 60 bearing a spur-gear 61 intermeshing with the gear 59. The frame extends laterally from the inwardly-projecting tubular portion 54 to form a portion 62 abutting against the outer face of the wall 7. From the portion 62 projects an arm 63 from which extends flanges 64 and 65. In the flange 65 and the portion 62 are bearings for a rotatable shaft 66. The shaft 66 bears a loosely-mounted gear 67 intermeshing with the gear 61 and receives motion therefrom. The gear 67 is provided with a hub 68 forming one member of a clutch. Splined on the shaft 66 is the companion member of the clutch 69 which is provided with nogs engaging a clutch operating lever 71 fulcrumed at 72 on the arm 63. The shaft 66 also bears a bevel-gear 73 positioned between the flanges 64 and 65. The arm 63 carries a wide bearing 74 in which is mounted a rotatable shaft 75 on which is a bevel-gear 76 intermeshing with the bevel-gear 73. The outer free end of the shaft 75 bears a chuck 77 of the ordinary type used for supporting rotatable ring-cores and on the chuck is a ring-core 78.

The extension 3 is provided with a channel or way 80 in which is mounted a tool carriage denominated generally by the reference numeral 81 and this carriage is capable of reciprocation toward and away from the core 78 through the medium of manipulating screw operated by a handle 82 in the usual manner. The upper portion of the carriage 81 is outwardly inclined and the upper portion is provided with a way 83 for a carrier 84 shiftable toward and away from the core 78. The under-face of the upper portion of the carriage 81 is provided with a pair of depending bearings 85 in which is a rotatable shaft 86 bearing at one end an operating handle 87 and at its opposite end a flanged drum 88. Positioned below the drum 88 is a cylinder 89, see Fig. 5 in which is a piston 90 carrying a piston-rod 91 to the end of which is connected a belt 92 attached to the drum 88 and running on the peripheral surface thereof. Extending through the piston 90 is an opening 93 arranged to be closed by a downwardly-opening valve 94 normally held in its closed position by a spring 95. The upper and lower portions of the cylinder are provided with ports, connected with which are pipes 96 and 97 in open communication with a three-way valve 98.

The operation and function of the cylinder 89 and the carrier 84 are as follows:—A fluid such for instance as water is admitted to the upper portion of the cylinder above the piston 90 and the water or other fluid will cause the piston to descend, provision being made by the valve 93 for the escape of the fluid below the piston and as the piston falls it draws the belt 92 downwardly and rotates the drum 88 and shaft 86. The shaft 86 bears a spur-pinion 198 meshing with the teeth of a rack 99 on the under face of the carrier 84 and this engagement of the pinion 198 with the rack 99 will shift the carrier 84 to the left in Fig. 6. This movement of the carrier will be a relatively slow movement and the speed of motion of the carrier 84 can be regulated by the flow of fluid through the pipe 96 into the cylinder 89 above the piston 90. For reasons which will appear later it is preferable that the carrier 84 be shifted to the right at a considerably greater speed than its movement to the left and for this purpose the operating handle 87 is employed which rapidly rotates the shaft 86, drum 88 and raises the piston 90 with equal speed and this movement is further permitted by the fact that as the piston 90 moves upwardly the valve 94 will open allowing the fluid above the piston to pass through the opening 93 to the chamber below the piston.

Secured to the under face of the carrier 84 by holding means 100 are brackets 101 L-shaped in cross-section with the upwardly-projecting portions spaced from the front working edge 102 of the carrier and provided with rack teeth 103. These two brackets 101 are positioned one on each side of the transverse median line of the carrier 84. Oppositely disposed to each bracket 101 and positioned on the upper face of the carrier 84 and in alinement with each other are two brackets 104 and 105. The faces of the brackets 104 and 105 which oppose the rack teeth 103 of the brackets 101 constitute bearing surfaces for the rolling movement of a pair of sleeves 106 one of which is positioned in the channel between one of the brackets 101 and bracket 104 and the other in the channel between one of the brackets 101 and the bracket 105. The peripheral faces of these sleeves constitute broken gears each having a plurality of teeth 107 arranged to intermesh with the rack teeth 103. The sleeves and their connected mechanism being similar the description will be confined to one and similar reference numerals will indicate similar parts in the two mechanisms. Each sleeve surrounds an upwardly-extending sleeve-like standard 108 provided with an opening 109 constituting a bearing to receive a non-rotatable hollow shaft 110 one end of which is provided with threads 111 to receive a flexible pipe 112. Rotatably mounted on the shaft 110 is a combined air distributing and spinning roll for smoothing and placing the shoe-building material on the core. This smoothing-tool comprises a hub 113 revolving on the shaft 110 and has an enlarged head 114 the outer portion 115 of which is capable of engagement with the fabric on the core for the smoothing and shaping thereof. The front face of the head 114 is recessed and has a plurality of blades or buckets 116 of involute curvature for a purpose to be later described. The head 114 is secured in position by means of a cap or nozzle 117 held in place by screws 118 and having a radially-extending discharge opening 119. The standards 108 are provided with inwardly-projecting arms 120 provided with posts 121 to which are secured coil-springs 122 anchored at their opposite ends to posts 123 on the upper face of the carrier 84.

Positioned above the core 78 is a discharge nozzle 125 connected with a pipe 126 see Fig. 2 in which is a valve 127. The pipe 126 may be supported by a suitable bracket 128. The pipes 112 and 126 are connected with a source of fluid, such as air, under high pressure for a purpose to be later described.

The operation of the device is as follows, and the description will be confined to the mechanism on the right side of the imaginary vertical line drawn centrally of the housing in Fig. 1: Two stock rolls equipped with alternate windings of tire-shoe building material and lining are placed in the bearings in the brackets 18. The fabric on these two rolls is preferably so formed or arranged that the strength-giving threads or cords of the fabric on one roll will be at approximately right angles with respect to the strength-giving threads of the fabric on the other roll and the two rolls are arranged to be brought alternately into alinement with the core 78 by manipulating the valve 43 as has already been described, and this manipulation consists in shifting the position of the carriage 12 carrying the two frames 14—15 and 16—17 laterally in the channel 10. The fabric on the stock roll in alinement with the core 78 is usually the first one employed and the stock is unwound from the stock roll and carried downwardly around the guiding roll 29 over the tension roll 26 and around the guiding roll 30 and applied to the core 78 as shown in Fig. 1. The core is then given one complete revolution by means of the motor 51 and the revolution of the core may be controlled through the medium of the clutch lever 71. The surplus of unemployed stock is cut from the applied strip and the ends of the strip are trimmed so as to form an abutting or lapping joint. The clutch lever 71 is then manipulated to cause a rotation of the core 78 and the speed of its revolution may be controlled by the motor 51. When the strip or layer 124 is applied to the core only the outer tread portion thereof will adhere to the core and this adhesion may be assisted and increased by directing a jet of air from the nozzle 125 during the applying of the fabric. In order to smooth down, shape and fashion the side portions of the strips along the sides of the core I employ the two spinning-rolls 114 which are brought forward by moving the valve 98 to its open position to admit a fluid to the cylinder 89 above the piston 90 which causes the piston 90 to descend thereby revolving the drum 88 and the shaft 86, which bears the pinion 198 intermeshing with the rack teeth 99 resulting in a movement of the carrier 84 toward the core. As the carrier moves slowly due to the increasing quantity of fluid in the cylinder above the piston 90, the spinning rolls engage the fabric on the core and receiving motion therefrom, the conoidally-shaped peripheral portions smooth the fabric down and shape it about the outer face of the core in order to form the shoe.

The spinning rolls 104 will be held in snug engagement with the tire-shoe stock on the core by the tension of the springs 122 which constantly tend to swing the spinning rolls inwardly toward each other, their revolution being permitted by the fact that the standards are mounted in the sleeves 106 and if during the movement of the carrier 84 inwardly toward the core it becomes necessary for the spinning rolls 114 to move outwardly to accommodate themselves to the constantly changing surfaces thereof and also to cause the spinning rolls to stand approximately radial to the curvature of the core body the sleeves are forced outwardly substantially in unison and the teeth 107 during the operation intermesh with the teeth 103 and the opposite faces of the sleeves 106 run against the faces of the brackets 104 and 105. It is contemplated that the spinning rolls 104 will gradually be forced inwardly toward the inner portions of the core and in doing so they traverse all of the surfaces of the plies or layers on which they roll and constantly maintain themselves in relatively radial positions with respect to the center of the curvature of the outer face of the core body. Experience has shown that during the rapid revolution of the core the unsecured or unadhered portions of the strips of the tire-building material on the core are thrown outwardly by the centrifugal force due to the revolution of the core and also excess material along the inner portions of the core have a tendency to buckle, and form plaits which must be smoothed out by the tools in order to form a perfect tire-shoe and experience has also shown that in the placing of these plies during the building of tire-shoes that air bubbles frequently occur. In order to obviate these various difficulties arising in the construction of a tire-shoe I force through the hollow shaft 110 by means of the supply pipe 112 a blast of air or other suitable fluid under high pressure directed outwardly through the opening or slot 119 in the nozzle 117 against the blades 116 in the recessed open end of the spinning rolls 114. The opening in the nozzle 119 will be so directed that the jet of air leaving the nozzle will be directed through the medium of the blades 116 against the unsecured and laterally projecting portions of the strips of tire-shoe building material on the core and causes the same to smooth themselves out and attach to the core in advance of the spinning rolls 114 and thereby greatly assist and aid the smoothing and shaping of the fabric about the core. By utilizing the blasts of air in opposite sides of the core to force the unsecured portions of the fabric to the core in advance of the smoothing or spinning rolls 114 the latter are enabled to act more quickly and with better results and less liability of injuring the fabric and producing bubbles in the construction of tire-shoes and they also obviate the danger of damaging the fabric, this last result being an unusually important one from the fact that frequently when blasts of air are not employed laterally against the outwardly flaring side portions of the strip of fabric on the rapidly revolving core the fabric is likely to become entangled with the spinning rolls and buckle up to form objectionable places in the product which is to be produced. When the carrier 84 has been moved by the weight of the fluid in the cylinder 89 to its inner position the handle 87 is manually manipulated and the carrier returns to its original outer position as has been already described and a second layer of fabric is applied to the core following the operation described with reference to the first layer. The number of layers and the placement of the beads on the tire-shoe being unimportant it is thought that a description thereof is unnecessary for the understanding of this invention. After the placement of each layer of tire-shoe-building material on the core it is preferable to shift the position of the carriage 12 by manipulating the valve 43 so as to bring one stock roll into alinement with the core 78 which has windings of fabric thereon, the strength-giving threads of which are at substantially right angles with respect to the strength-giving threads of the last applied layer and during the building up of the tire-shoe this shifting of the position of the carriage 12 can take place at will so that if it is desired to place two layers of fabric on the core in succession with the strength-giving threads thereof extending in parallelism the carriage can remain stationary and then can be shifted to put on two more layers with the strength-giving threads thereof in parallelism with each other but at right angles with respect to the strength-giving threads of previously applied layers. In fact any arrangement of the layers can be had as desired and the operator is not compelled by utilizing this invention to alternate the direction of the strength-giving threads of succeeding layers and he is entirely at liberty and is enabled to apply the layers with the strength-giving threads extending in any preferred direction.

I claim,

1. A tire-shoe making machine comprising the combination of a power driven ring-core, stock rolls for supplying strips of sheeted fabric to said core, a smoothing roller for use in applying said strips to said core, and means for directing a blast of suitable fluid from said roller against said strips during their application to said core.

2. A tire-shoe making machine comprising the combination of a power driven ring-core, stock rolls for supplying strips of sheeted fabric to said core, a smoothing roller for use in applying said strips and means carried by said roller for delivering a blast of suitable fluid against said strips.

3. A tire-shoe making machine comprising the combination of a power driven ring-core, stock rolls for supplyng strips of sheeted fabric to said core, a smoothing roller for use in applying said strips to said core and means carried by said roller for delivering a blast of suitable fluid against said strips during their application to said core.

4. A tire-shoe making machine comprising the combination of a power driven ring-core, stock rolls for supplying strips of sheeted fabric to said core, a smoothing roller for use in applying said strips to said core, a tubular shaft to support said smoothing roller, a discharge nozzle coacting with said smoothing roller and means connecting said hollow shaft with a fluid supply under pressure.

5. A tire-shoe making machine comprising the combination of a power driven ring-core, stock rolls for supplying strips of sheeted fabric to said core, a smoothing roller provided with a recessed portion, a hollow shaft for supporting said smoothing roller, a discharge nozzle within said recess and connected with said hollow shaft and means connecting said hollow shaft with a supply of suitable fluid under pressure for application to said strips during their placement on said core.

6. A tire-shoe making machine comprising the combination of a power driven ring-core, stock rolls for supplying strips of sheeted fabric to said core, a smoothing roller for use in applying strips to said core, said roller provided with a recess, a hollow shaft constituting a support for said roller, a plurality of deflecting blades in said recess, a nozzle secured to said hollow shaft within said recess for directing a fluid from said shaft against said blades and strips and means for connecting said hollow shaft with a supply of suitable fluid.

7. A tire-shoe making machine comprising the combination of a power driven ring-core, stock rolls for supplying strips of sheeted fabric to said core, a discharge nozzle comprising a smoothing roller for use on said strips and positioned to discharge a fluid against said strips during their placement on said core and a supply of suitable fluid under pressure connected with said nozzle.

8. A tire-shoe making machine comprising the combination of a power driven ring-core, stock rolls for supplying strips of sheeted fabric to said core, a smoothing roller for use in applying said strips to said core, means for directing a blast of suitable fluid from said roller against said strips during their application and means for supporting and shifting the position of said roller.

9. A tire-shoe making machine comprising the combination of a power driven ring-core, stock rolls for supplying strips of sheeted fabric to said core, a carrier shiftable toward and away from said core, a smoothing roller mounted on said carrier, means for directing a blast of suitable fluid from said roller against said strips during their application to said core and means for shifting said carrier.

10. A tire-shoe making machine comprising the combination of a power driven ring-core, stock rolls for supplying strips of sheeted fabric to said core, a carrier shiftable radially of said core, a smoothing roller mounted on said carrier and adapted to engage the strips of fabric during their placement on said core, means for directing a blast of suitable fluid from said roller against said strips during their application, automatic operating means for moving said carrier toward said core at a relatively slow speed and manually controlled means for shifting said carrier in the opposite direction at a greater speed.

11. A tire-shoe making machine comprising the combination of a power driven ring-core, stock rolls for supplying strips of sheeted fabric to said core, a carrier shiftable radially of said core, a smoothing roller mounted in said carrier adapted to engage the fabric during the placement on said core, means connected with said smoothing roller for directing a blast of suitable fluid against said strips during their application to said core, means tending normally to hold said roller in engagement with the fabric on said core approximately radially to the periphery thereof.

12. A tire-shoe making machine comprising the combination of a power driven ring-core, stock rolls for supplying strips of sheeted fabric to said core, a carrier capable of being shifted radially of said core, a bearing rotatably mounted on said carrier and capable of bodily movement toward and away from the longitudinal central line of said carrier, a hollow shaft mounted in said bearing, a smoothing roller mounted on said shaft for use in applying the strips of fabric to said core, means for directing a blast of suitable fluid from said roller against said strips during their application and means for shifting said carrier toward and away from said core.

13. A tire-shoe making machine comprising the combination of a power driven ring-core, stock rolls for supplying strips of sheeted fabric to said core, a carrier capable of being shifted radially of said core, a bearing rotatably mounted on said carrier and capable of bodily movement toward and away from the longitudinal central line of said carrier, a hollow shaft mounted in said bearing, a smoothing roller on said shaft for use in applying the strips of fabric to said core, means for directing a blast of suitable fluid from said roller against said strips during their application and means for shifting said carrier toward and away from said core, said means capable of moving the carrier in one direction at a speed greater than its movement in its opposite direction.

14. A tire-shoe making machine comprising the combination of a power driven ring-core, stock rolls for supplying strips of sheeted fabric to said core, a carrier shiftable radially of said core, a bearing on said carrier capable of rotation and bodily movement transversely of the line of movement of said carrier, a hollow shaft supported in said bearing, a smoothing roller mounted on said shaft, a nozzle on the end of said shaft for directing a blast of suitable fluid against said strips during their application and means connecting said hollow shaft with supply of fluid under pressure.

15. A tire-shoe making machine comprising the combination of a power driven ring-core, stock rolls for supplying strips of sheeted fabric to said core, a carrier shiftable radially of said core, a spinning-roller supported by said carrier, a bearing for said spinning roll capable of movement to permit the spinning-roller to move about the outer surface of said core in planes approximately radial to the outer surface of said core, means for directing a blast of suitable fluid from said roller against said strips during their application to said core.

16. A tire-shoe making machine comprising the combination of a power driven ring-core, stock rolls for supplying strips of sheeted fabric to said core, a carrier shiftable radially of said core, a smoothing roller for use in applying strips to said core mounted on said carrier and in a rotatable bearing capable of shifting transversely to the line of movement of said carrier to permit the smoothing roller to move about the surface of said core in planes approximately radial thereto and means having connection with said roller for directing a blast of suitable fluid against said strips during their application.

17. A tire-shoe making machine comprising the combination of a power driven ring-core, stock rolls for supplying strips of sheeted fabric to said core, a carrier shiftable radially of said core, a smoothing roller for use in applying strips to said core mounted on said carrier and in a rotatable bearing capable of shifting transversely to the line of movement of said carrier to permit the smoothing roller to move about the surface of said core in planes approximately radial thereto and means having connection with said roller for directing a blast of suitable fluid against said strips during their application, and means having a constant tendency to hold the working edge of said roller in constant engagement with the strips.

18. A tire-shoe making machine comprising the combination of a power driven ring-core, stock rolls for supplying strips of sheeted fabric to said core, a carrier shiftable radially of said core, a smoothing roller comprising a nozzle for a jet of suitable fluid and supported by said carrier for use in applying said strips to said core, a fluid motor for shifting said carrier toward said core and means for shifting said carrier in a reverse direction.

19. A tire-shoe making machine comprising the combination of a power driven ring-core, stock rolls for supplying strips of sheeted fabric to said core, a carrier shiftable radially of said core, a smoothing roller for use in applying said strips to said core mounted on said carrier, and mechanism operated by gravity for drawing said carrier toward said core.

20. A tire-shoe making machine comprising the combination of a power driven ring-core, stock rolls for supplying strips of sheeted fabric to said core, a carrier shiftable radially of said core, a smoothing roller for use in applying said strips to said core mounted on said carrier, mechanism operated by gravity for shifting said carrier toward said core, and manually operated means for moving said carrier in a reverse direction.

21. A tire-shoe making machine comprising the combination of a power driven ring-core, stock rolls for supplying strips of sheeted fabric to said core, a carrier shiftable radially of said core, a smoothing core for use in applying said strips to said core mounted on said carrier, a shaft on said carrier, a drum on said shaft, means connecting said shaft with said carrier, a cylinder, a piston in said cylinder having flexible connection with said drum, means for conveying a fluid to said cylinder for operating said piston for revolving said drum to shift said carrier, and means for rotating said drum in the opposite direction.

22. A tire-shoe making machine comprising the combination of a power driven ring-core, stock rolls for supplying strips of sheeted fabric to said core, a carrier shiftable radially of said core, a fluid operated piston having connection with said carrier for shifting it in one direction, manual means for reversing movement of said carrier, a smoothing roller on said carrier for use in applying said strips to said core, and means having connection with said roller for directing a blast of suitable fluid against said strips during their application.

23. A tire-shoe making machine comprising the combination of a power driven ring-core, stock rolls for supplying strips of sheeted fabric to said core, a carrier shiftable radially of said core, a gravity operated piston having flexible connection with said carrier for shifting it toward said core, manually operated means for reversing movement of said carrier, a hollow shaft on said carrier, a nozzle on the end of said shaft adapted to direct a blast of suitable fluid against the strips during their application and means for connecting said hollow shaft with a supply of fluid under pressure.

24. A tire-shoe making machine comprising the combination of a power driven ring-core, stock rolls for supplying strips of sheeted fabric to said core, a carrier shiftable radially of said core, mechanism operated by gravity having connection with said carrier for shifting it toward said core, means for reversing the movement of said carrier, a suitably supported hollow shaft mounted on said carrier and capable of movement transversely of the line of movement of said carrier and of independent rotation on its support, a smoothing roller on said shaft, a nozzle on the end of said shaft for directing a blast of suitable fluid against said strips during their placement, means for supplying a fluid under pressure to said hollow shaft, and means having a tendency to force the working-edge of said smoothing roller into snug engagement with the strips on said core.

25. A tire-shoe making machine comprising the combination of a power driven ring-core, stock rolls for supplying strips of sheeted fabric to said core, a carrier shiftable radially of said core, a fluid operated piston having connection with said carrier for shifting it toward said core, means for reversing the movement of said carrier, a bearing on said carrier capable of rotation and also of movement transverse to the line of movement of said carrier, a hollow shaft suitably supported in said bearing, a smoothing roller mounted on said hollow shaft, one face of which is provided with a recess, fluid directing blades in said recess, a nozzle on the end of said shaft within said recess adapted to direct a blast of fluid from said hollow shaft against said blades and strips, and means having a constant tendency to hold said smoothing roller against the strips on said core during the shifting of said carrier and in planes approximately radial to the axis of curvature of the core.

26. A tire-shoe making machine comprising the combination of a power driven ring-core, stock rolls for supplying strips of sheeted fabric to said core, a supporting member shiftable radially of said core, a combined nozzle and smoothing roller connected with a supply of fluid under pressure mounted on said member and arranged to direct said fluid against said strips during their placement on said core.

27. A tire-shoe making machine comprising the combination of a power driven ring-core, stock rolls for supplying strips of sheeted fabric to said core, a supporting member shiftable radially of said core, a combined nozzle and smoothing roller connected with a supply of fluid under pressure mounted on said member and arranged to direct said fluid against said strips during their placement on said core.

28. A tire-shoe making machine comprising the combination of a power driven ring-core, stock rolls for supplying strips of sheeted fabric to said core, a supporting member shiftable radially of said core, a combined nozzle and smoothing roller mounted on said member, a supporting instrumentality connecting said nozzle with said member to permit the discharge end of said nozzle to be swung to direct a fluid from said nozzle over selected portions of the strips during their placement on said core and means connecting said nozzle with a source of fluid under pressure.

29. A tire-shoe making machine comprising the combination of a power driven ring-core, stock rolls for supplying strips of sheeted fabric to said core, a supporting member shiftable radially of said core, a combined nozzle and smoothing roller mounted for independent rotation and for movement transversely of movement of said member on said member and means connecting said nozzle with a supply of fluid under pressure.

30. A tire-shoe making machine comprising the combination of a power driven ring-core, stock rolls for supplying strips of sheeted fabric to said core, a supporting member shiftable radially of said core, a combined nozzle and smoothing roller, a bearing therefor mounted on said member said bearing permitting independent rotation of said nozzle and movement transversely of the line of movement of said member, means connecting said nozzle with a supply of fluid under pressure to shift said member.

31. A tire-shoe making machine comprising the combination of a power driven ring-core, a plurality of racks shiftable in unison and in parallelism with the axis of said core, stock rolls on each rack for supplying strips of sheeted fabric to said core, and a fluid operated motor for shifting the position of the racks to bring the selected stock rolls into proximity to said core.

32. A tire-shoe making machine comprising a combination of a power driven ring-core, a plurality of racks shiftable in parallelism with respect to the axis of revolution of said core, a stock roll on each rack for supplying strips of sheeted fabric to said core, a supporting frame for said racks, a fluid operated piston having connection with said racks, a valve controlling the admission of operating fluid to said piston for shifting the position of said piston and racks to bring selected stock rolls into proximity to said core.

In testimony whereof I have hereunto set my hand.

MICHAEL PARIDON.